US011862138B2

(12) United States Patent
Kuenzle et al.

(10) Patent No.: US 11,862,138 B2
(45) Date of Patent: Jan. 2, 2024

(54) HEARING DEVICE COMPRISING AN ACTIVE EMISSION CANCELLER

(71) Applicant: Oticon A/S, Smørum (DK)

(72) Inventors: Bernhard Kuenzle, Düdingen (CH); Meng Guo, Smørum (DK)

(73) Assignee: OTICON A/S, Smørum (DK)

( * ) Notice: Subject to any disclaimer, the term of this patent is extended or adjusted under 35 U.S.C. 154(b) by 111 days.

(21) Appl. No.: 17/684,723

(22) Filed: Mar. 2, 2022

(65) Prior Publication Data

US 2022/0284878 A1 Sep. 8, 2022

(30) Foreign Application Priority Data

Mar. 3, 2021 (EP) .................................... 21160490

(51) Int. Cl.

*G10K 11/178* (2006.01)
*G10L 21/0232* (2013.01)
*H04R 1/10* (2006.01)

(52) U.S. Cl.

CPC .... *G10K 11/17813* (2018.01); *G10L 21/0232* (2013.01); *H04R 1/1016* (2013.01); *H04R 1/1041* (2013.01); *H04R 1/1091* (2013.01)

(58) Field of Classification Search

CPC .......... G10K 11/17813; G10L 21/0232; H04R 1/1016; H04R 1/1041; H04R 1/1091

See application file for complete search history.

(56) References Cited

U.S. PATENT DOCUMENTS

| | | | |
|---|---|---|---|
| 6,920,227 B2 | 7/2005 | Chalupper et al. | |
| 8,014,548 B2 | 9/2011 | Stirnemann et al. | |
| 2008/0130927 A1 | 6/2008 | Theverapperuma et al. | |
| 2013/0142369 A1* | 6/2013 | Zhang | H04R 25/554 381/317 |
| 2019/0394576 A1* | 12/2019 | Petersen | H04R 25/453 |
| 2021/0092530 A1* | 3/2021 | Thomsen | H04R 25/50 |

OTHER PUBLICATIONS

European Search Report issued in priority application No. 21160490.5 dated Jul. 26, 2021.

* cited by examiner

*Primary Examiner* — David L Ton

(74) *Attorney, Agent, or Firm* — Birch, Stewart, Kolasch & Birch, LLP

(57) ABSTRACT

A hearing device comprises a forward path comprising an input transducer providing at an electric input signal representative of environment sound, a signal processor for processing said at least one electric input signal and providing a processed signal, and a loudspeaker connected to a speaker sound outlet providing an output sound to an eardrum of the user in dependence of said processed signal. The hearing device comprises an ITE-part adapted for being located in an ear canal of the user, an active emission canceller providing an electric sound cancelling signal, and an environment facing loudspeaker providing an output sound to the environment. The electric sound cancelling signal is determined in dependence of said processed signal to attenuate sound leaked from the speaker sound outlet to the environment when played by the environment facing loudspeaker. The environment facing loudspeaker has a sound outlet on an environment facing surface of the ITE-part.

20 Claims, 10 Drawing Sheets

HEARING DEVICE COMPRISING AN ACTIVE EMISSION CANCELLER

SUMMARY

The present disclosure relates to hearing devices, e.g. hearing aids or headsets (or ear phones). The present disclosure specifically deals with Active Emission Cancellation (AEC) in hearing devices. AEC can be considered as an inverse of Active Noise Cancellation (ANC). In ANC, undesired sounds (typically noise) inside an ear canal of a wearer of the hearing device are subjected to cancellation, so that the user would not hear these undesired sounds. In the AEC approach, it is the sound that leaks from the inside to the outside of the ear canal that is subjected to be cancelled, so that the surroundings avoid being exposed to (hearing) it as a disturbing sound. The sound may leak through ventilation channels in an earpiece of a hearing device or between the ear canal and the earpiece. The leaked sound may be picked up by environment facing microphone(s) and result in instability of the hearing device. Such unintentional ('feedback') sound is typically dominated by middle and higher frequencies, e.g. frequencies above 1 kHz. The instability problem may be fully or partially addressed by a feedback cancellation system. However, it becomes problematic in another way, if the emitted sounds are so loud that it is audible to persons located in the surroundings, even though the hearing device is stable and unaffected by the emission sound (e.g. due to its feedback cancellation system). The problem may be present in a hearing aid compensating for a severe hearing loss of a user (where amplification is large and a risk of leakage—depending on the hearing aid style—correspondingly large). Another use scenario for AEC may e.g. be a headset wearer (or a wearer of earphones) listening to loud music, which may be annoying to persons in the immediate surroundings.

A First Hearing Device:

In an aspect of the present application, a hearing device adapted for being located at or in an ear of a user is provided. The hearing device comprises

- forward path, the forward path comprising
  - at least one forward path input transducer configured to pick up environment sound from the environment around the user when the user is wearing the hearing device, the at least one input transducer providing at least one electric input signal representative of said environment sound,
  - a forward path signal processor for processing said at least one electric input signal, or a signal originating therefrom, and providing a processed signal, and
  - a forward path loudspeaker connected to a speaker sound outlet configured to provide an output sound to an eardrum of the user in dependence of said processed signal.

The hearing device may further comprise

- an active emission canceller configured to provide an electric sound cancelling signal, and
- an environment facing loudspeaker connected to the active emission canceller and configured to provide an output sound to the environment.

The active emission canceller may be connected to the environment facing loudspeaker. The electric sound cancelling signal may be determined in dependence of the processed signal or a signal originating therefrom. The electric sound cancelling signal may be configured to cancel or attenuate sound leaked from the speaker sound outlet to the environment when played by the environment facing loudspeaker.

Thereby an improved hearing device may be provided.

The hearing device may comprise an ITE-part adapted for being located at least partially in an ear canal of the user, wherein the speaker sound outlet is located.

The hearing device may comprise a ventilation channel (or a multitude of ventilation channels), e.g. located in or on an ITE-part, the ITE-part e.g. comprising an (optionally customized) ear mould.

The hearing device may comprise an ITE-part comprising a dome-like structure (e.g. configured to guide the ITE-part in the ear canal of the user). The dome like structure may be arranged as an open dome-like structure comprising one or more openings. The one or more openings may be configured to allow sound to propagate though them. The dome-like structure may be made of a flexible material allowing it (within a certain range) to be formed by the cross-section of the ear canal. The dome-like structure may be closed without any intentional openings allowing air to pass through it.

The forward path input transducer may comprise a microphone.

The hearing device may comprise an eardrum facing input transducer configured to pick up said output sound from the speaker sound outlet and provide an electric signal representative thereof, and wherein the electric sound cancelling signal is determined in dependence thereof.

The eardrum facing input transducer may comprise a microphone, e.g. a bon conducting microphone, or a vibration sensor, e.g. an accelerometer.

The eardrum facing input transducer may be located in the ITE-part. The eardrum facing input transducer may be located on or have a sound inlet on an eardrum facing surface of the ITE-part (e.g. of a housing of the ITE-part), e.g. in the vicinity of (e.g. next to) a main leakage opening for sound from the residual volume at the eardrum to the environment (without being located in, or directly connected to, a ventilation channel of the hearing device), see e.g. FIG. 2B.

The forward path loudspeaker may be located in the ITE-part.

The hearing device may comprise a BTE part adapted for being located at or behind pinna.

The forward path loudspeaker may be located in the BTE-part. The speaker sound outlet may comprise or be connected to an acoustic tube for guiding said output sound to said ITE-part for being presented to the user's eardrum.

The at least one forward path input transducer may be located in the BTE-part.

The environment facing loudspeaker may be located in the ITE-part. The environment facing loudspeaker may be located on or have a sound outlet on an environment facing surface of the ITE-part (e.g. of a housing of the ITE-part), e.g. in the vicinity of a main leakage outlet of sound from the residual volume to the environment (without being located in, or directly connected to, a ventilation channel of the hearing device), see e.g. FIG. 2B.

The hearing device may be constituted by an ITE-part (or configured not to have a BTE-part). The forward path input transducer and the (optional) eardrum facing input transducer may both be located in the ITE-part. The environment facing loudspeaker and the forward path loudspeaker may both be located in the ITE-part.

The hearing device may be configured to provide that said electric sound cancelling signal is an estimate of the signal leaked from a residual volume at the eardrum to the environment at the environment facing loudspeaker, and that it is played by the environment facing loudspeaker in opposite phase. When the estimate of the leaked signal is played in opposite phase, the leaked signal will be cancelled or (at least) diminished.

The hearing device (e.g. the active emission canceller) may comprise a fixed filter configured to provide said electric sound cancelling signal in dependence of a predefined filter characteristic. The electric sound cancelling signal may be provided by filtering the processed signal or a signal originating therefrom (e.g. a signal picked up by an eardrum-facing input transducer) by the fixed filter (cf. e.g. FIG. 5).

The hearing device (e.g. the active emission canceller) may comprise an adaptive filter configured to provide said electric sound cancelling signal in dependence of an adaptively determined filter characteristic. The electric sound cancelling signal may be provided by filtering the processed signal (cf. e.g. FIG. 6, 7) or a signal originating therefrom (e.g. a signal picked up by an eardrum-facing input transducer (cf. e.g. FIG. 8)) by the adaptive filter. The adaptive filter may be updated by an adaptive algorithm in dependence of the at least one electric input signal (cf. e.g. FIG. 6, 7, 8), or a signal originating therefrom, and the processed signal (cf. e.g. FIG. 6, 7, 8), or a signal originating therefrom (and/or of the electric input signal from an eardrum facing input transducer (e.g. comprising a microphone), (cf. e.g. FIG. 8)).

The hearing device may comprise a multi-path sound outlet from the environment facing loudspeaker. Thereby the environment facing loudspeaker is allowed to direct its output sound towards each their preferred direction, e.g. configured to minimize the leaked sound from the hearing device in different spatial parts of the environment (e.g. where leaked sound from the residual volume at the eardrum is expected to emerge).

The hearing device may comprise one or more additional loudspeakers for active emission cancellation (termed AEC-loudspeakers). The one or more AEC-loudspeakers may e.g. be environment-facing. The environment facing loudspeaker and/or the one or more additional AEC-loudspeakers may e.g. be directed towards each their preferred direction, e.g. configured to minimize the leaked sound from the hearing device in different spatial parts of the environment.

The hearing device may comprise a feedback control system configured to cancel or attenuate residual feedback. The residual feedback may e.g. be or comprise the (resulting) AEC compensated signal $S_{RES}$. The active emission control (AEC) system according to the present disclosure may be configured co-exist with a feedback control system. The active emission control (AEC) system according to the present disclosure may, however, also be configured be a stand-alone system (functioning without the aid of a traditional feedback control system).

The hearing device may be constituted by or comprise an air-conduction type hearing aid, a headset, an earphone or a pair of earphones, an active ear protection device or a combination thereof.

The hearing device may comprise a hearing aid adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing device may comprise an output unit for providing a stimulus perceived by the user as an acoustic signal based on a processed electric signal. The output unit may comprise an output transducer. The output transducer may comprise a receiver (loudspeaker) for providing the stimulus as an acoustic signal to the user (e.g. in an acoustic (air conduction based) hearing aid).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry allowing a wireless link to an entertainment device (e.g. a TV-set), a communication device (e.g. a telephone), a wireless microphone, or to another hearing device (e.g. a hearing aid), etc. The hearing device may thus be configured to wirelessly receive a direct electric input signal from another device. Likewise, the hearing device may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing device can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, such as less than 20 g.

The hearing device may comprise a 'forward' (or 'signal') path for processing an audio signal between an input and an output of the hearing device. A signal processor may be located in the forward path. The signal processor may be adapted to provide a frequency dependent gain according to a user's particular needs (e.g. hearing impairment). The hearing device may comprise an 'analysis' path comprising functional components for analyzing signals and/or controlling processing of the forward path. Some or all signal processing of the analysis path and/or the forward path may be conducted in the frequency domain, in which case the hearing device comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices may comprise a digital-to-analogue (DA) converter to convert a digital signal to an analogue output signal, e.g. for being presented to a user via an output transducer.

The hearing device, e.g. the input unit, and or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain) The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a trained neural network.

The hearing device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing device may further comprise other relevant functionality for the application in question, e.g. compression, noise reduction, etc.

The hearing device may comprise a hearing instrument, e.g. a hearing instrument adapted for being located at the ear or fully or partially in the ear canal of a user, e.g. a headset, an earphone (or a pair of earphones), an ear protection device or a combination thereof. A hearing system comprising the hearing device may comprise a speakerphone (comprising a number of input transducers and a number of output transducers, e.g. for use in an audio conference situation), e.g. comprising a beamformer filtering unit, e.g. providing multiple beamforming capabilities.

A Second Hearing Device:

In an aspect of the present application, a hearing device adapted for being located at or in an ear of a user is provided by the present disclosure. The hearing device comprises

- a forward path, the forward path comprising
  - at least one forward path input transducer configured to pick up environment sound from the environment around the user when the user is wearing the hearing device, the at least one input transducer providing at least one electric input signal representative of said environment sound,
  - a forward path signal processor for processing said at least one electric input signal, or a signal originating therefrom, and providing a processed signal,
  - a forward path loudspeaker connected to a speaker sound outlet configured to provide an output sound to an eardrum of the user in dependence of said processed signal, and
- an ITE-part adapted for being located at least partially in an ear canal of the user,
- an active emission canceller configured to provide an electric sound cancelling signal,
- an adaptive filter configured to provide said electric sound cancelling signal in dependence of an adaptively determined filter characteristic,
- an environment facing loudspeaker connected to the active emission canceller and configured to provide an output sound to the environment, wherein the environment facing loudspeaker is located on or has a sound outlet on an environment facing surface of the ITE-part,
- wherein the active emission canceller is connected to the environment facing loudspeaker and wherein the electric sound cancelling signal is determined in dependence of said processed signal or a signal originating therefrom and configured to cancel or attenuate sound leaked from the speaker sound outlet to the environment when played by the environment facing loudspeaker,
- wherein the electric sound cancelling signal is provided by filtering the processed signal or a signal originating therefrom by the adaptive filter, and wherein the filter characteristic of the adaptive filter is updated by an adaptive algorithm in dependence of the at least one electric input signal or a signal originating therefrom, and the processed signal or a signal originating therefrom.

The ITE-part may comprise an (e.g. open) dome-like structure comprising one or more openings, which are configured to allow sound to propagate through them.

The hearing device may comprise an eardrum facing input transducer located in the ITE-part and configured to pick up said output sound from the speaker sound outlet and to provide an electric signal representative thereof, and wherein the electric sound cancelling signal is determined in dependence thereof.

The eardrum facing input transducer may located on or have a sound inlet on an eardrum facing surface of the ITE-part.

The electric sound cancelling signal may be provided by filtering, by the adaptive filter, the processed signal and/or the electric signal picked up by the eardrum facing input transducer. The filter characteristic of the adaptive filter may be updated by an adaptive algorithm in dependence of the at least one electric input signal or a signal originating therefrom, and the processed signal and/or the electric signal picked up by the eardrum facing input transducer.

The features of the first hearing device described above, in the detailed description of embodiments and in the drawings and claims are intended to be combinable with the second hearing device as appropriate.

Use:

In an aspect, use of a hearing device as described above, in the 'detailed description of embodiments' and in the claims, is moreover provided. Use may be provided in a system comprising one or more hearing devices (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing device (e.g. a hearing aid) is furthermore provided by the present application. The hearing device is adapted for being located at or in an ear of a user. The hearing device comprises a forward path. The forward path comprises a) at least one forward path input transducer configured to pick up environment sound from the environment around the user when the user is wearing the hearing device, the at least one input transducer providing at least one electric input signal representative of said environment sound, b) a forward path signal processor for processing said at least one electric input signal, or a signal originating therefrom, and providing a processed signal, and c) a forward path loudspeaker connected to a speaker sound outlet configured to provide an output sound to an eardrum of the user in dependence of said processed signal. The method may comprise providing an electric sound cancelling signal;

providing an output sound to the environment in dependence of the electric sound cancelling signal;

determining the electric sound cancelling signal in dependence of the processed signal or a signal originating therefrom wherein the electric sound cancelling signal is configured to cancel or attenuate sound leaked from the speaker sound outlet to the environment when played by the environment facing loudspeaker.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control may be implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP may be configured to run on cellular phone, e.g. a smartphone, or on another portable device allowing communication with said hearing device or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present disclosure relates to hearing devices, e.g. hearing aids or headsets or ear phones. The present disclosure specifically deals with Active Emission Cancellation (AEC) in hearing devices.

Figure 1:
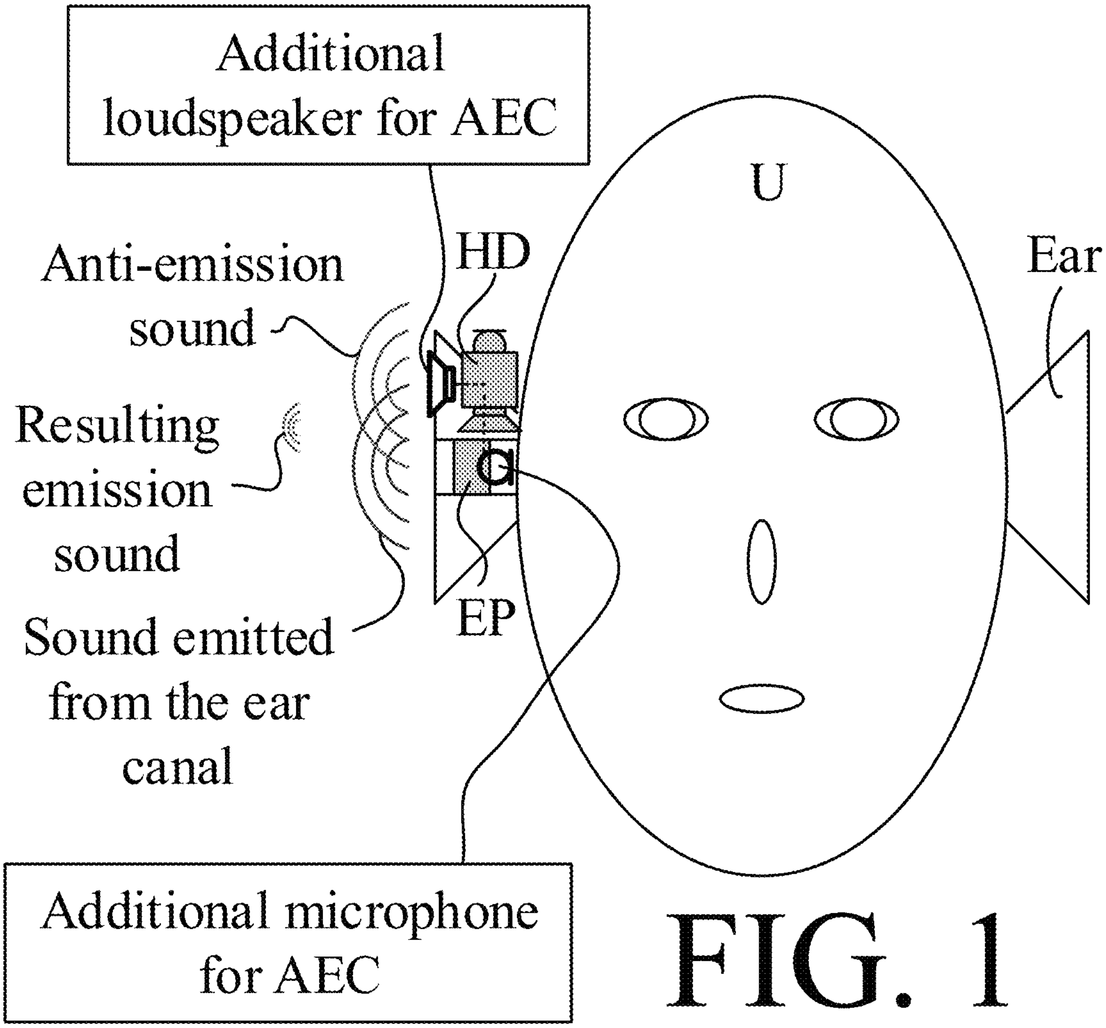
FIG. 1 schematically illustrates the principle of Active emission Cancellation (AEC)

FIG. 1 schematically illustrates the principle of Active emission Cancellation (AEC). Traditionally, a hearing aid user (U) wears a hearing device (HD) consisting of or comprising an earpiece (EP) at or in an ear (Ear) of the user (U). The hearing aid can be arranged in different configurations (styles) such as Behind-The-Ear (BTE), Receiver-In-The-Ear (RITE), In-The-Canal (ITC), Completely-In-Canal (CIC), etc. The earpiece and the rest of the hearing aid (e.g. a separate body adapted to be arranged at or behind the ear (e.g. Pinna) of the user (U)). In all cases, the amplified sounds are presented to the eardrum, and it can 'leak' to the outside world from the ear canal when the sound level gets too high. This sound emission happens through the ventilation channels on the earpiece or through the leakage between the ear canal and the earpiece (see sound symbols denoted 'Sound emitted from the ear canal' in FIG. 1), similar to the acoustic feedback problem in hearing aids. However, it becomes problematic if the emitted sounds are so loud that it is audible to persons located in the surroundings, even though the hearing aid might be stable and unaffected by this emission sound due to its feedback control system. Another scenario may e.g. be a headset wearer (or a wearer of ear phones) listening to loud music, which may be annoying to persons in the immediate surroundings.

It is proposed to use an additional loudspeaker (denoted 'Additional loudspeaker for AEC' in FIG. 1) (HD) to play an anti-emission signal (denoted 'Anti-emission sound' in FIG. 1) controlled by the hearing aid (HD) to compensate for the emitted sounds to the environment, so that the resulting signal (denoted 'Resulting emission sound') has a limited amplitude and (preferably) becomes inaudible to the outside world (e.g. to persons located around the hearing aid user (U)).

This would be a similar (but inverse) approach of what is known as the ANC approach. In other words, as we know what is being presented at the traditional hearing device receiver (to the eardrum), we can create an anti-emission signal (opposite phase) to be played by the additional speaker.

A further modification to this idea is to also add an optional microphone inside the ear canal (denoted 'Additional microphone for AEC' in FIG. 1) controlled by the hearing aid, with the goal of measuring actually presented sounds at the eardrum (rather than using the sounds played by the receiver), and in this way to be able to get an even better anti-emission signal.

The AEC signal can be obtained by using a fixed filtering of the hearing aid output signal through a fixed compensation filter ($\underline{a}$), and it can be determined up front based on measurement data, either for individual users or as an average for a number of users.

Figure 4:
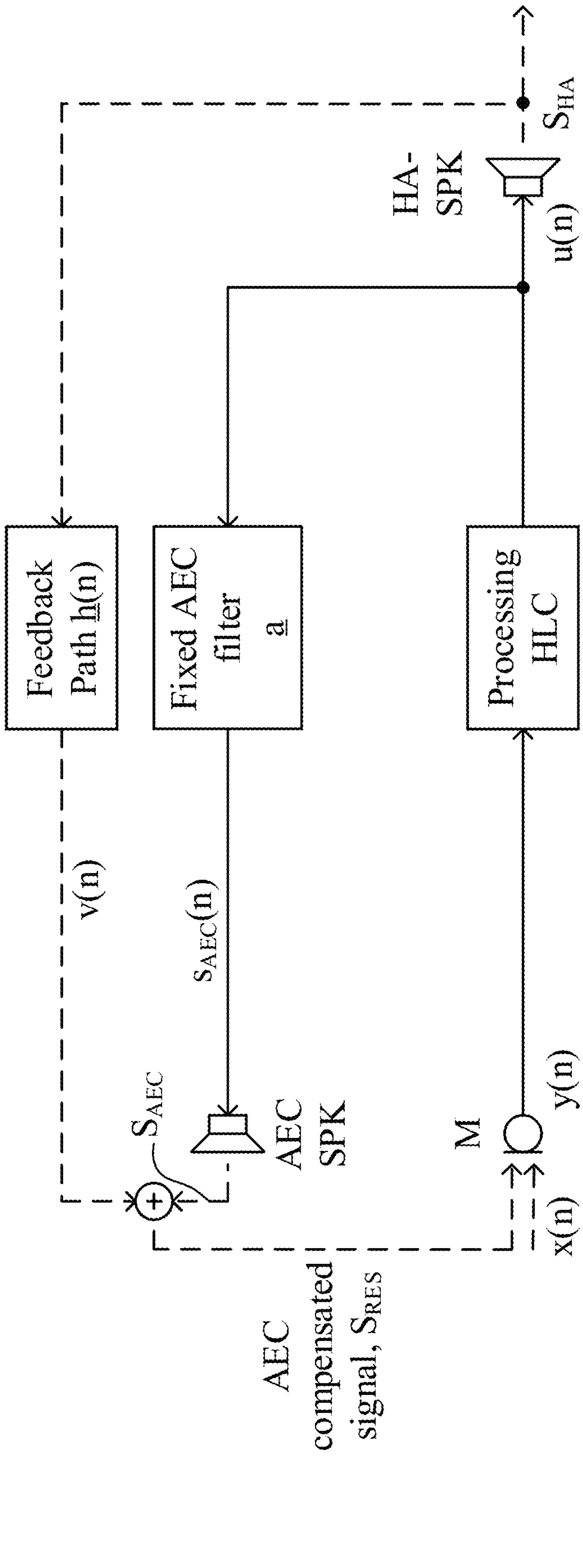
FIG. 4 shows a simplified block diagram of an embodiment of a hearing device according to the present disclosure comprising an active emission cancelation system comprising a fixed filter.
Figure 5:
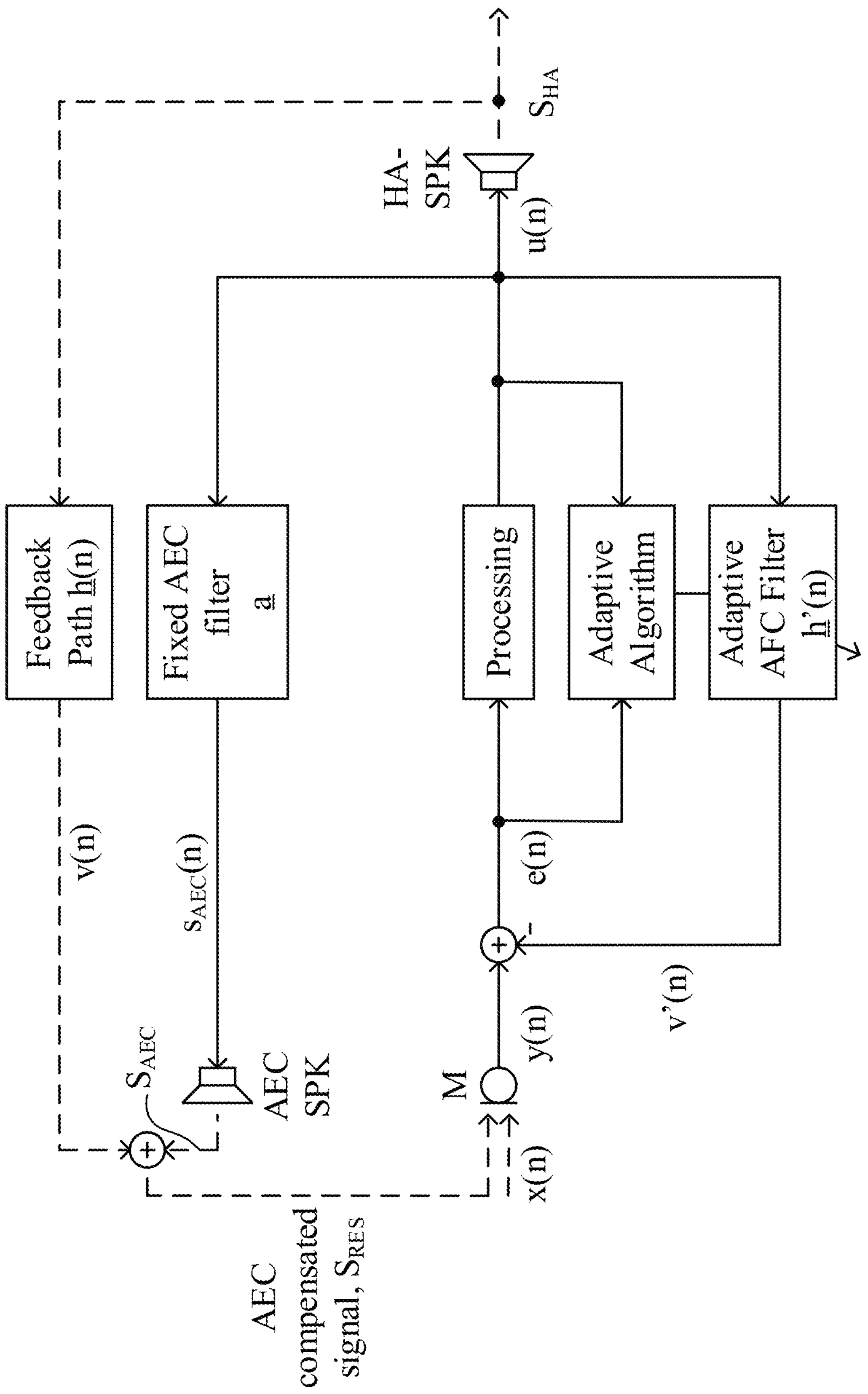
FIG. 5 shows a simplified block diagram of an embodiment of a hearing device according to the present disclosure comprising an active emission cancelation system comprising a fixed filter as shown in FIG. 4 and additionally comprising an adaptive feedback control system.

- This fixed filter ($\underline{a}$) can be applied as a stand-alone filter. This is illustrated in FIG. 4.
- This fixed filter ($\underline{a}$) can be applied in addition to the existing feedback cancellation system with the adaptive filter ($\underline{h}'(n)$). This is illustrated in FIG. 5.

The AEC signal can be obtained by using a time-varying filter ($\underline{a}(n)$), and an adaptive algorithm, similar and/or identical to the well-known feedback cancellation system, can be used to estimate the AEC filter ($\underline{a}(n)$). In contrast to the traditional feedback cancellation system, which has the goal to ensure system stability, this AEC filter has typically a somehow less strict constraint to create an anti-emission signal, in order to make the emission sound inaudible to the external world, so the estimation to this time-varying filter ($\underline{a}(n)$) can be simpler, slower compared to the estimation to the traditional feedback cancellation filter ($\underline{h}'(n)$).

Figure 6:
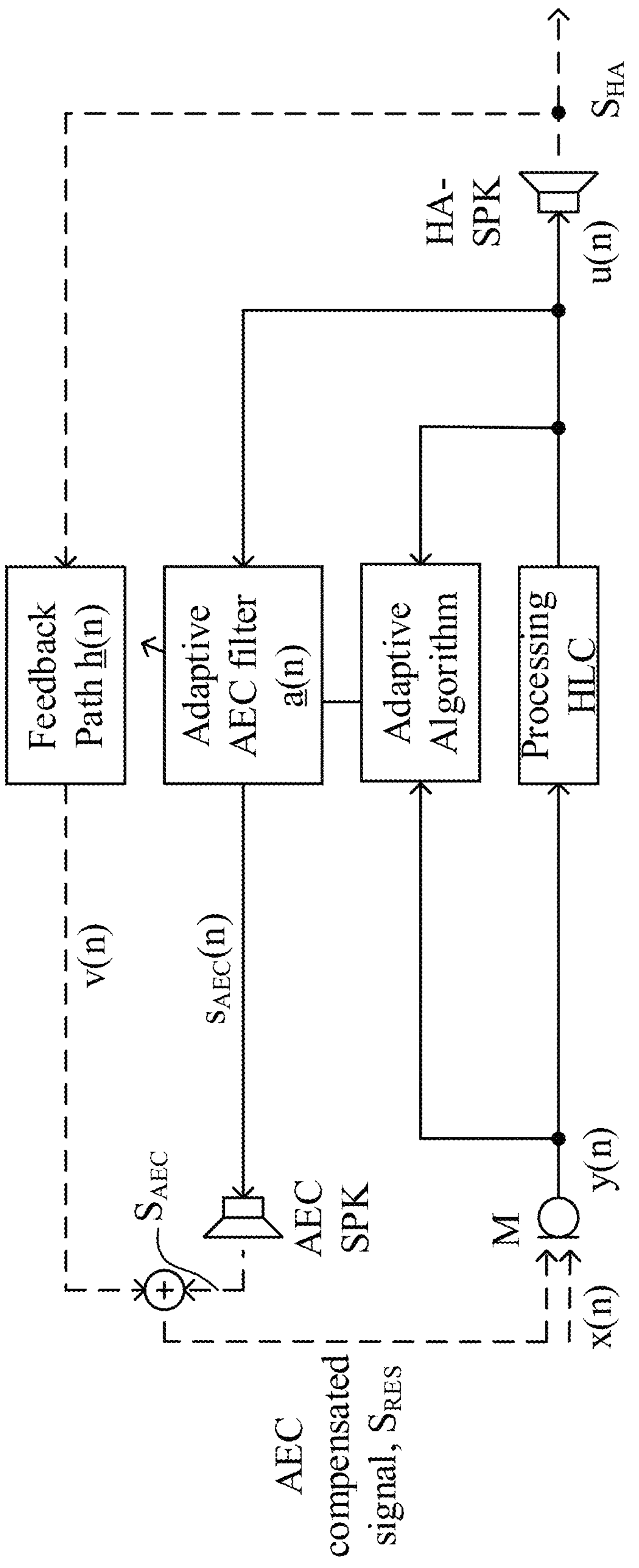
FIG. 6 shows a simplified block diagram of an embodiment of a hearing device according to the present disclosure comprising an active emission cancelation system comprising an adaptive filter.
Figure 7:
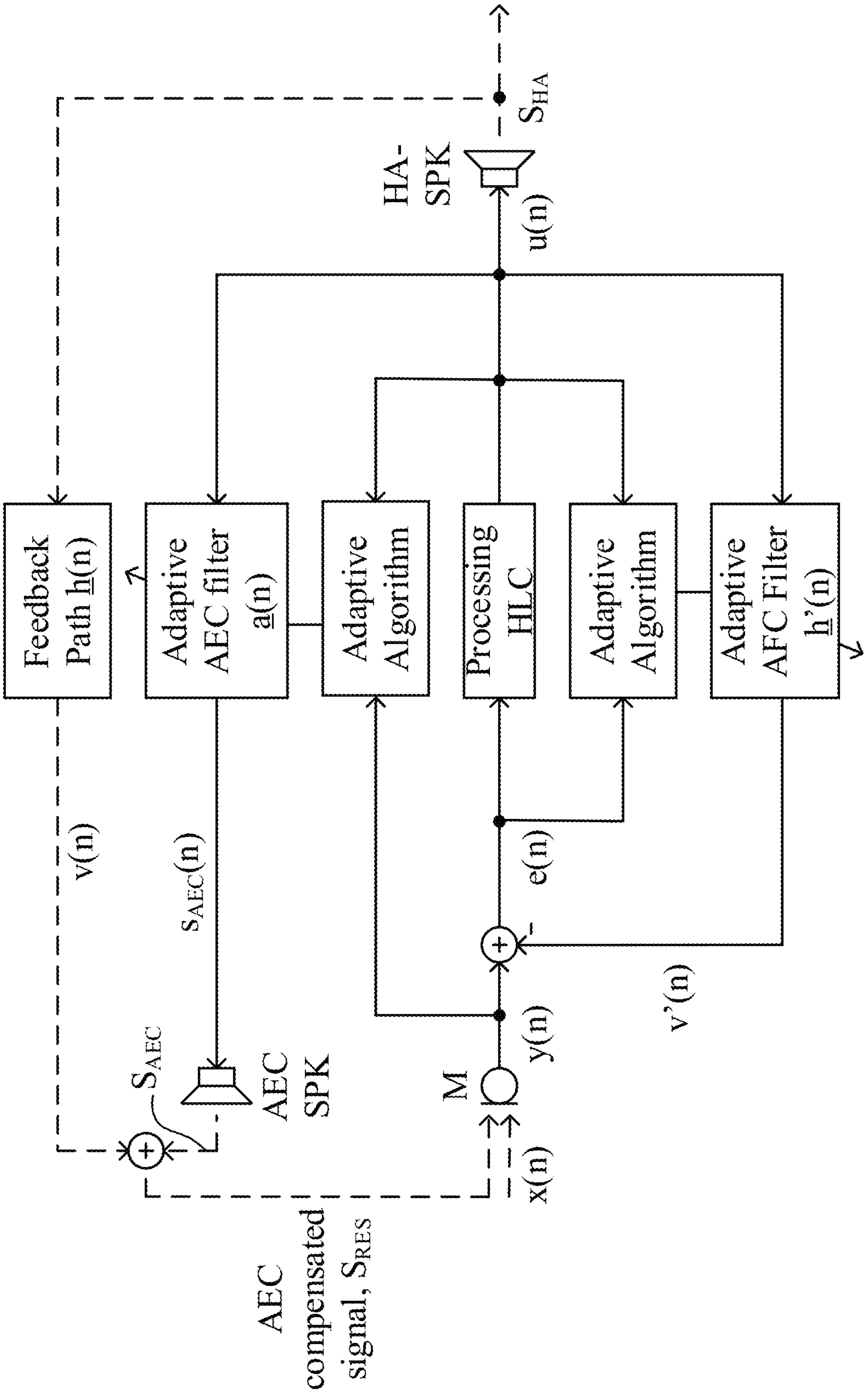
FIG. 7 shows a simplified block diagram of an embodiment of a hearing device according to the present disclosure comprising an active emission cancelation system comprising an adaptive filter as shown in FIG. 6, and additionally comprising an adaptive feedback control system.

- In one setup, the AEC filter ($\underline{a}(n)$) is used without a traditional hearing aid feedback cancellation filter ($\underline{h}'(n)$). This is illustrated in FIG. 6.
- In another setup, The AEC filter (a(n)) is used with a modified hearing aid feedback cancellation filter ($\underline{h}'(n)$) which would minimize the residual feedback. This is illustrated in FIG. 7.

Figure 8:
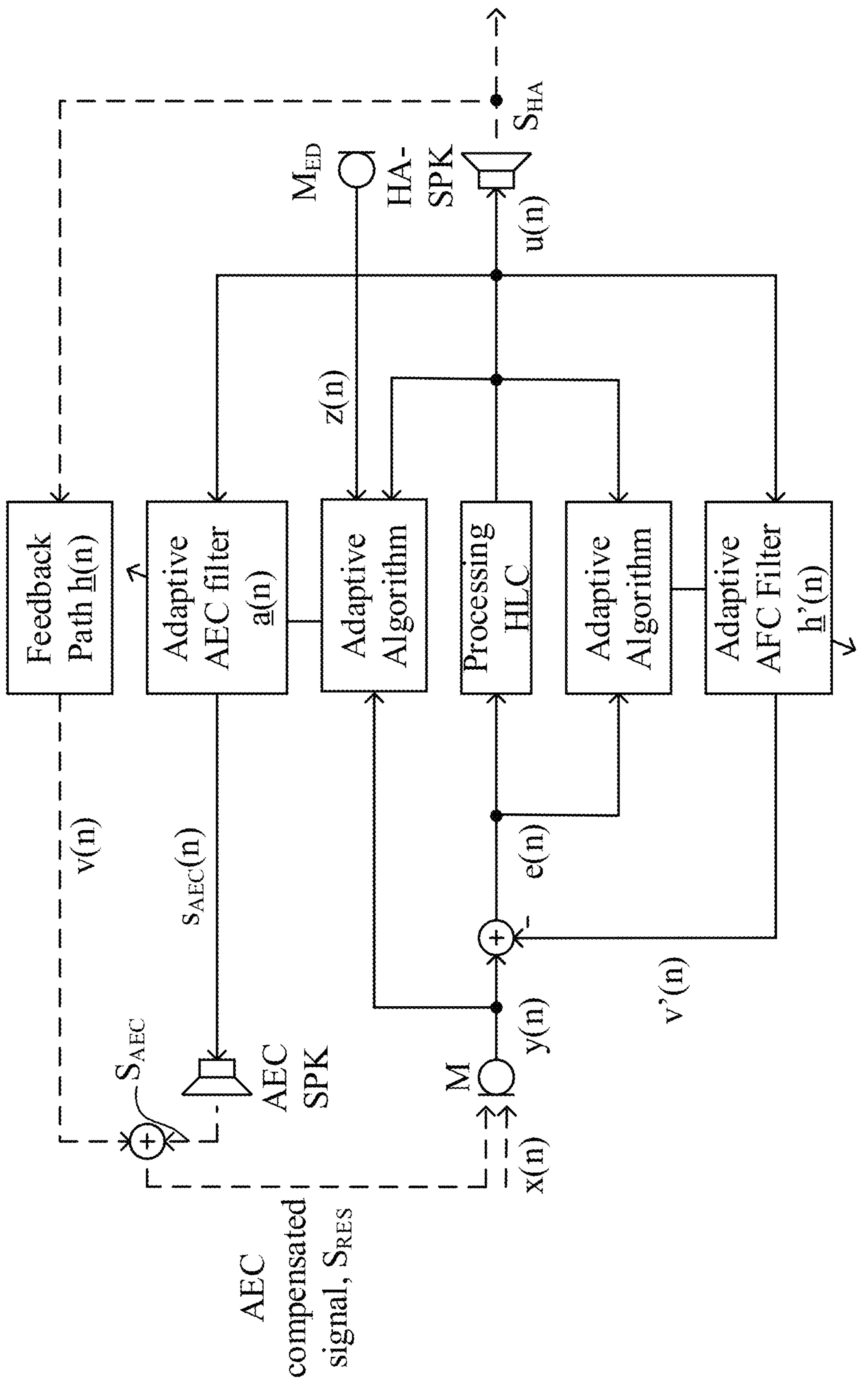
FIG. 8 shows a simplified block diagram of an embodiment of a hearing device according to the present disclosure comprising an active emission cancelation system comprising an adaptive filter and an adaptive feedback control system as shown in FIG. 7, and wherein the active emission cancelation system additionally comprises an eardrum facing microphone.

An additional in-ear microphone may be used to monitor the "true" sound levels at different frequencies, and it can be used to finetune/correct the AEC signals by adjusting the filter $\underline{a}(n)$, see e.g. FIG. 8.

Figure 2A:
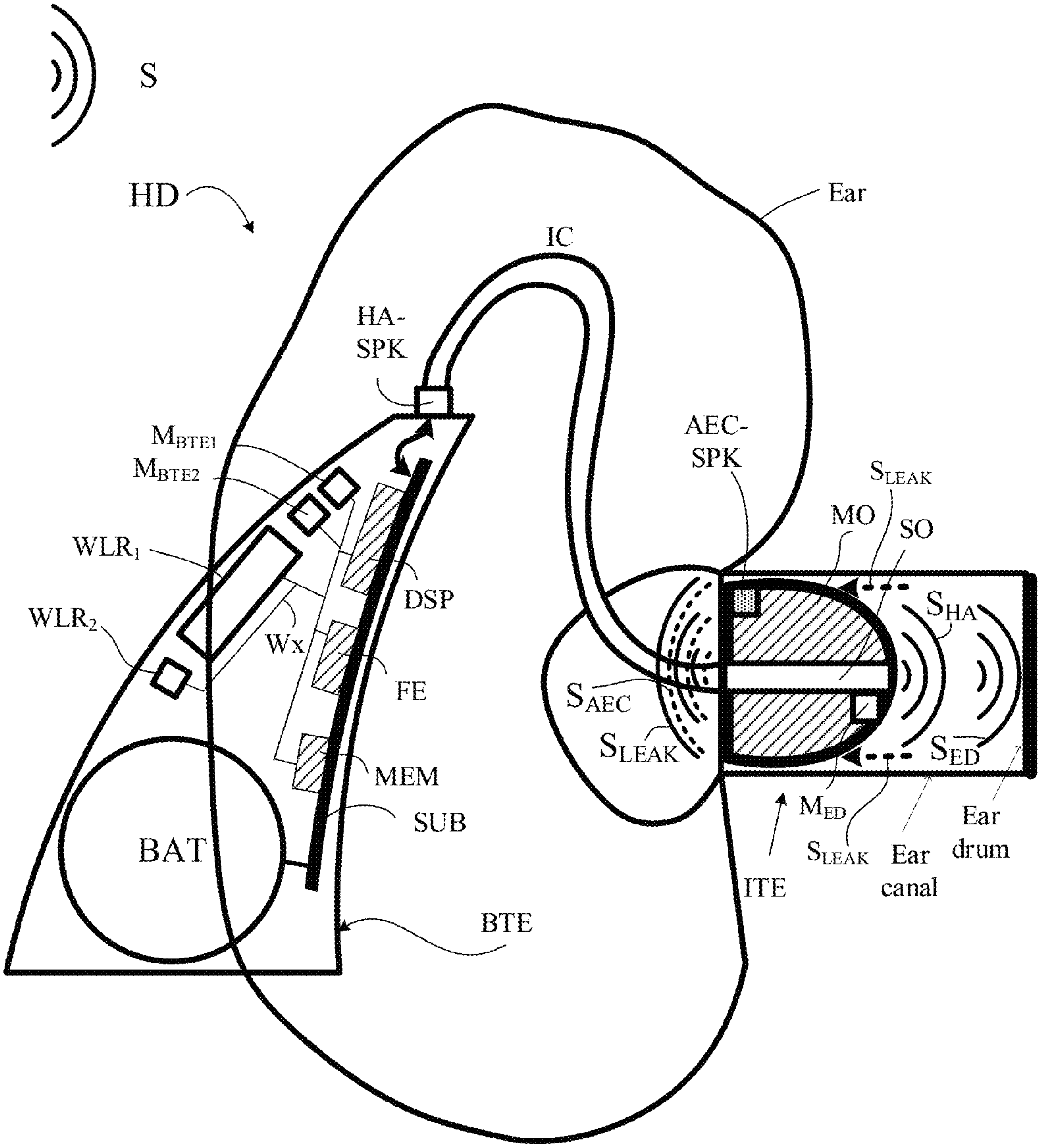
FIG. 2A shows an embodiment of a BTE-style hearing aid comprising an active emission canceller according to the present disclosure.

FIG. 2A shows an embodiment of a BTE-style hearing aid (HD) comprising an active emission canceller according to the present disclosure. The hearing device (HD) comprises a BTE-part comprising a loudspeaker (HA-SPK) and an ITE-part comprising an (possibly customized) ear mould (MO). The BTE-part and the ITE-part are connected by an acoustic propagation element (e.g. a tube IC). The BTE-part (BTE) is adapted for being located at or behind an ear of a user, and the ITE-part (ITE) is adapted for being located in or at an ear canal of a user's ear. The ITE-part comprises a through-going opening providing a speaker sound outlet (SO) for the loudspeaker of the BTE-part (HA-SPK) allowing sound to be propagated via the connecting element (IC) to the ear drum (Eardrum) of the user (cf. sound field $S_{ED}$). The BTE-part and the ITE-part may be electrically connected by connecting element (IC) in addition to the acoustic propagation channel, e.g. a hollow tube. The loudspeaker HA-SPK of the BTE-part is configured to play into the connecting element (IC) and further into the speaker sound outlet (SO) of the ITE-part. The loudspeaker is connected by internal wiring in the BTE-part (cf. e.g. schematically illustrated as wiring Wx in the BTE-part) to relevant electronic circuitry of the hearing device, e.g. to a processor (DSP). The BTE-parts comprises first and second input transducers, e.g. microphones ($M_{BTE1}$ and $M_{BTE2}$), respectively, which are used to pick up sounds from the environment of a user wearing the hearing device (cf. sound field S). The ITE-part comprises an ear-mould and is intended to allow a relatively large sound pressure level to be delivered to the ear drum of the user (e.g. to a user having a severe-to-profound hearing loss). Nevertheless, a part of the sound ($S_{HA}$) provided by the loudspeaker (HA-SPK) of the BTE-part may leak out along the interface between the ITE-part and the ear canal tissue (sf. Sound $S_{LEAK}$). Such leaked sound may lead to unwanted feedback problems if picked by microphone of the hearing aid and amplified and presented to the user via the loudspeaker (HA-SPK). Such 'acoustic feedback' may be controlled by a proper feedback control system (e.g. (partly) compensated by the AEC system according to the present disclosure). The leaked sound $S_{LEAK}$ may however also be heard by persons around the user (and possibly by the user him- or herself). The BTE-part (e.g. the DSP) further comprises an active emission canceller configured to provide an electric sound cancelling signal fed to an environment facing loudspeaker (AEC-SPK). The environment facing loudspeaker is located in the ITE-part facing the environment (when the ITE-part is mounted in or at the ear canal (Ear canal) of the user). The environment facing loudspeaker converts the electric sound cancelling signal to an output sound ($S_{AEC}$) to the environment. The ITE-part further comprises an eardrum facing input transducer ($M_{ED}$, e.g. a microphone) located so that it picks up sound from the speaker sound outlet (SO) of the ITE-part and provides an electric signal representative thereof. The active emission canceller is configured to determine the electric sound cancelling signal in dependence of said electric signal of the eardrum facing input transducer ($M_{ED}$). The output sound ($S_{AEC}$) to the environment from the environment facing loudspeaker (AEC-SPK) is thereby aimed to cancel or attenuate sound ($S_{LEAK}$) leaked to the environment from the speaker sound outlet of the hearing aid.

The hearing aid (HD) (here the BTE-part) further comprises two (e.g. individually selectable) wireless receivers ($WLR_1$, $WLR_2$) for providing respective directly received auxiliary audio input and/or control or information signals. The wireless receivers may be configured to receive signals from another hearing device (e.g. of a binaural hearing system) or from any other communication device, e.g. telephone, such as a smartphone, or from a wireless microphone or a T-coil. The wireless receivers may be capable of receiving (and possibly also of transmitting) audio and/or control or information signals. The wireless receivers may be based on Bluetooth or similar technology or may be based on near-field communication (e.g. inductive coupling).

The BTE-part comprises a substrate SUB whereon a number of electronic components (MEM, FE, DSP) are mounted. The BTE-part comprises a configurable signal processor (DSP) and memory (MEM) accessible therefrom. In an embodiment, the signal processor (DSP) form part of an integrated circuit, e.g. a (mainly) digital integrated circuit.

The hearing aid (HD) exemplified in FIG. 2A represents a portable device and further comprises a battery (BAT), e.g. a rechargeable battery, for energizing electronic components of the BTE-part and possibly the ITE-part.

The hearing aid (e.g. the processor (DSP)) may be adapted to provide a frequency dependent gain and/or a level dependent compression and/or a transposition (with or without frequency compression) of one or more frequency ranges to one or more other frequency ranges, e.g. to compensate for a hearing impairment of a user.

Figure 2B:
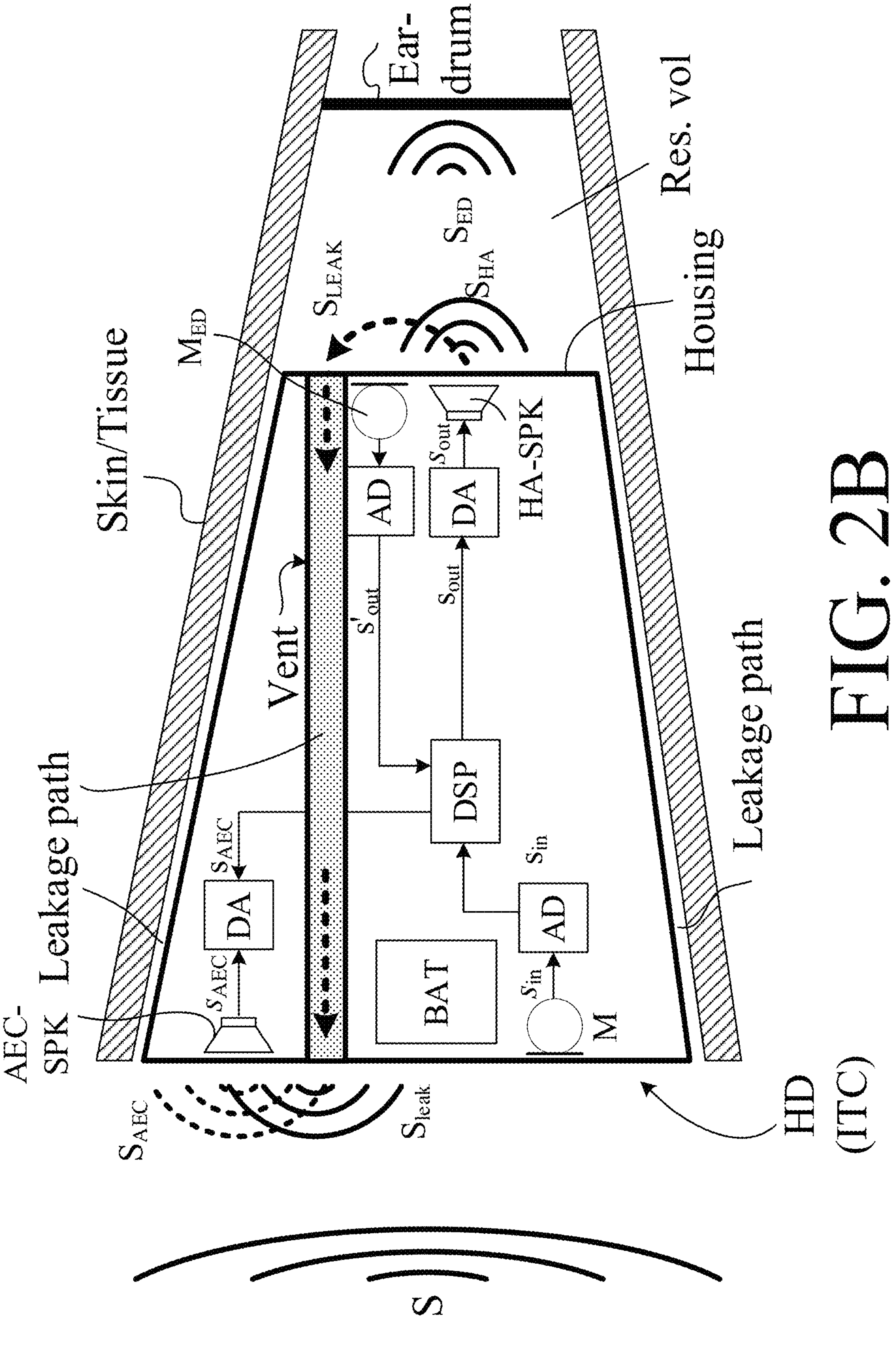
FIG. 2B shows an embodiment of an ITC style hearing aid comprising an active emission canceller according to the present disclosure.

FIG. 2B shows an embodiment of an ITC (ITE) style hearing aid comprising an active emission canceller according to the present disclosure. The hearing aid (HD) comprises or consists of an ITE-part (ITC) comprising a housing (Housing), which may be a standard housing aimed at fitting a group of users, or it may be customized to a user's ear (e.g. as an ear mould, e.g. to provide an appropriate fitting to the outer ear and/or the ear canal). The housing schematically illustrated in FIG. 2B has a symmetric form, e.g. around a longitudinal axis from the environment towards the ear drum (Eardrum) of the user (when mounted), but this need not be the case. It may be customized to the form of a particular user's ear canal. The hearing aid may be configured to be located in the outer part of the ear canal, e.g. partially visible from the outside, or it may be configured to be located completely in the ear canal (implementing a CIC-styler hearing aid), possibly deep in the ear canal, e.g. fully or partially in the bony part of the ear canal.

To minimize leakage of sound (played by the hearing aid towards the ear drum of the user) from the ear canal to the environment (cf. 'Leakage path' in FIG. 2B), a good mechanical contact between the housing of the hearing aid and the Skin/tissue of the ear canal is aimed at. In an attempt to minimize such leakage, the housing of the ITE-part may be customized to the ear of a particular user.

The hearing aid (HD) comprises a at least one environment facing (forward path) microphone, here one microphone (M), e.g. located on a part of the surface of the housing that faces the environment when the hearing aid is operationally mounted in or at the ear of the user. The microphone is configured to convert sound received from a sound field (S) around the user at its location to an (analogue) electric signal ($s_{in}$) representing the sound. The microphone is coupled an analogue to digital converter (AD) to provide (analogue) electric signal ($s_{in}$) as a digitized signal ($s_{in}$). The digitized signal may further be coupled to a filter bank to provide the electric input signal (time domain signal ($s_{in}$)) as a frequency sub-band signal (frequency domain signal). The (digitized) electric input signal ($s_{in}$) is fed to a digital signal processor (DSP) for applying one or more processing algorithms to the audio signal ($s_{in}$), e.g. including one or more of noise reduction, compression (frequency and level dependent amplification/attenuation according to a user's needs, e.g. hearing impairment), spatial cue preservation/restoration, feedback control, active noise cancellation, as well as active emission control according to the present disclosure, etc. The digital signal processor (DSP) may e.g. comprise appropriate filter banks (e.g. analysis as well as synthesis filter banks) to allow processing in the frequency domain (individual processing of frequency sub-band signals). The digital signal processor (DSP) is configured to provide a processed signal $s_{out}$ comprising a representation of the sound field S (e.g. including an estimate of a target signal therein). The processed signal $s_{out}$ is fed to an output transducer (here a forward path loudspeaker (HA-SPK), e.g. via a digital to analogue converter (DA) or a digital to digital converter, for conversion of a processed (digital electric) signal $s_{out}$ (or analogue version $s_{out}$) to a sound signal $S_{HA}$ The hearing aid (HD (ITC)) may e.g. comprise a ventilation channel (Vent) configured to minimize the effect of occlusion (when the user speaks). In addition to allowing an (unintended) acoustic propagation path $S_{leak}$ from a residual volume (cf. Res. Vol in FIG. 2B) between a hearing aid housing and the ear drum to be established (cf. 'Leakage path' in FIG. 3), the ventilation channel also provides a direct acoustic propagation path of sound from the environment to the residual volume. The directly propagated sound $S_{dir}$ reaching the residual volume is mixed with the acoustic output ($S_{HA}$) of the hearing aid (HD) to create a resulting sound $S_{ED}$ at the ear drum. In a mode of operation, active noise suppression (ANS or ANC) is activated in an attempt to cancel out the directly propagated sound $S_{dir}$. According to the present disclosure, e.g. in a specific AEC-mode of operation, the digital signal processor (DSP) comprises an active emission canceller (AEC, cf. e.g. FIG. 3) configured to provide an electric sound cancelling signal ($s_{AEC}$) in dependence of the processed (digital electric) signal $s_{out}$. The electric sound cancelling signal ($s_{AEC}$) is fed to an environment facing loudspeaker (AEC-SPK), e.g. via a digital to analogue converter (DA), as appropriate. The environment facing loudspeaker converts the electric sound cancelling signal ($s_{AEC}$) to an output sound ($S_{AEC}$) to the environment. The intention of the output sound ($S_{AEC}$) is to cancel (or at least attenuate) the leaked sound $S_{LEAK}$ (cf. 'Leakage path' in FIG. 2B). The ITE-part (ITC) further comprises an eardrum facing input transducer ($M_{ED}$, e.g. a microphone) located so that it picks up sound from the forward path loudspeaker (HA-SPK) and provides an electric signal ($s'_{out}$) representative thereof (e.g. via an analogue to digital converter (AD), as appropriate). The active emission canceller (AEC) of the digital signal processor (DSP) is configured to determine the electric sound cancelling signal in dependence of the electric signal ($s'_{out}$) of the eardrum facing input transducer ($M_{ED}$), possibly in combination with the processed (digital electric) signal $s_{out}$. The output sound ($S_{AEC}$) to the environment from the environment facing loudspeaker (AEC-SPK) is aimed to cancel or attenuate sound ($S_{LEAK}$) leaked to the environment from the speaker sound outlet of the hearing aid (to not disturb persons around the hearing aid user's, if the amplification of the input sound provided by the hearing aid (and/or the 'openness' of the ITE-part) is large).

The AD and DA converters may form part of the DSP, as appropriate.

The hearing aid comprises an energy source, e.g. a battery (BAT), e.g. a rechargeable battery, for energizing the components of the device.

Figure 2C:
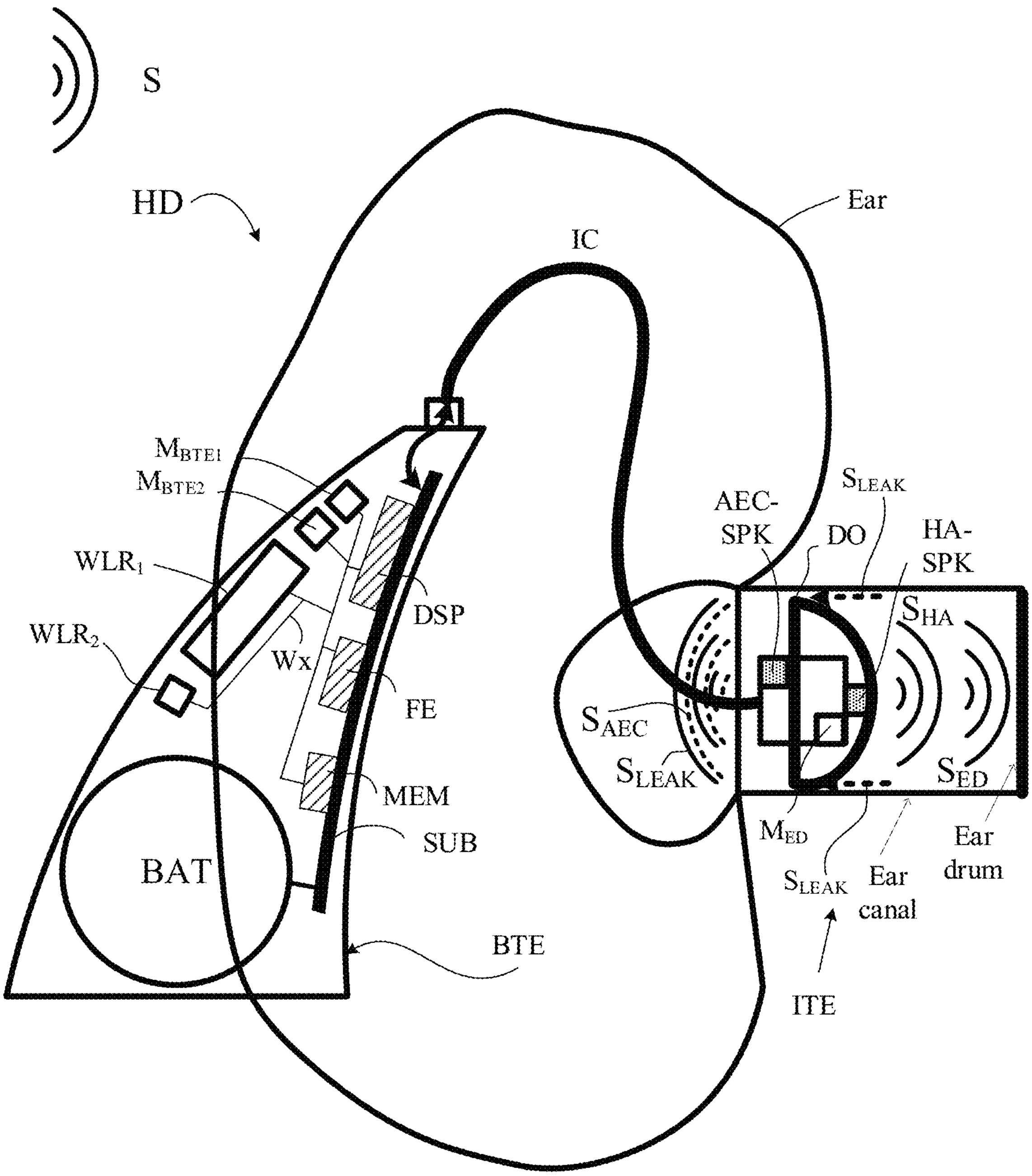
FIG. 2C shows an embodiment of a RITE-style hearing aid comprising an active emission canceller according to the present disclosure.

FIG. 2C shows an embodiment of a RITE style hearing aid comprising an active emission canceller according to the present disclosure. The embodiment of FIG. 2C resembles the embodiment of FIG. 2A, both comprise a BTE-part wherein the energy (battery (BAT) and main processing of the hearing aid is provided (the latter via digital signal processor DSP, memory (MEM), frontend- (FE) and radio-chips ($WLR_1$, $WLR_2$)). A difference is that the forward path loudspeaker (HA-SPK) of the embodiment of FIG. 2C is located in an ITE-part located in an ear canal of the user instead of in the BTE-part. To connect the loudspeaker (HA-SPK) with the signal processor (DSP), the acoustic tube of the connecting element (IC) in FIG. 2A is dispensed with in the embodiment of FIG. 2C, so that the connection element is implemented by an electric cable (only). The electric cable is configured to comprise a multitude of electrically conducting wires or channels to allow the processor of the BTE part to communicate with the forward path loudspeaker (HA-SPK), the environment facing loudspeaker (AEC-SPK) and the eardrum facing microphone ($M_{ED}$, if present), and possible other electronic components of the ITE part (ITE). Further, the electric cable may also be configured to allow energising the electronic components of the ITE-part (as well as those of the BTE-part) from the battery (BAT) of the BTE-part.

The partition of functional tasks between the BTE-part and the ITE-part may be different from the one mentioned in connection with the embodiments of FIGS. 2A and 2C. Some of the processing, for example the processing of the active emission canceller (AEC) may be located in the ITE-part to avoid communication related to the environment facing loudspeaker (AEC-SPK) and/or the eardrum facing microphone ($M_{ED}$, if present) to/from the signal processor (DSP) of the BTE-part. Thereby the electric interface (IC) between the BTE- and ITE-parts may be simplified.

Figure 3:
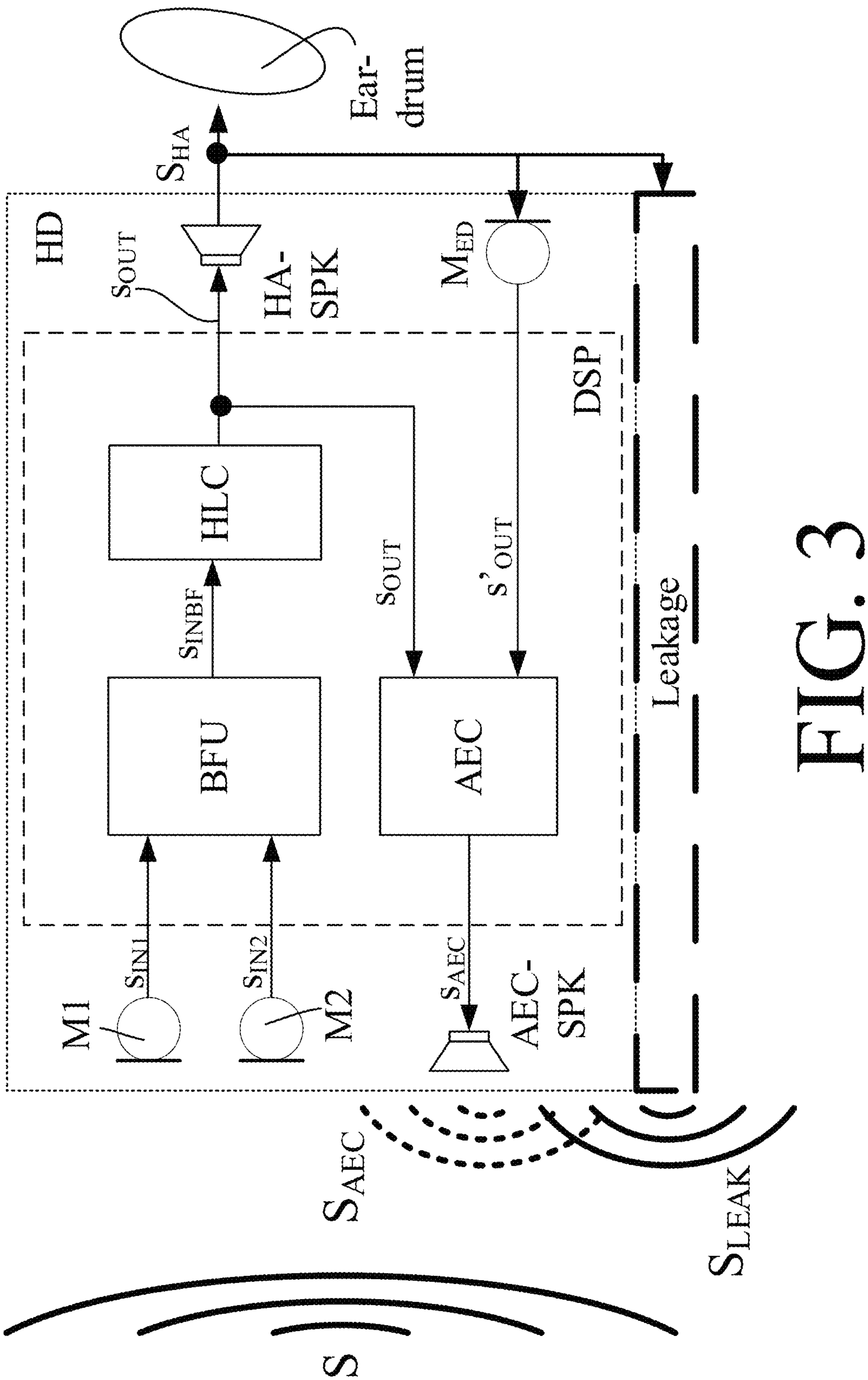
FIG. 3 shows a simplified block diagram of an embodiment of a hearing device comprising an active emission canceller according to the present disclosure.

FIG. 3 shows a simplified block diagram of an embodiment of a hearing aid comprising an active emission canceller according to the present disclosure. The hearing aid (HD) may be adapted for being located at or in an ear of a user. The hearing aid comprises a forward path for processing an audio input signal and providing a (preferably) improved, processed, signal intended for presentation to the user. The forward path comprises at least one forward path input transducer (e.g. microphone(s), here first and second microphones (M1, M2), configured to pick up environment sound from the environment around the user when the user is wearing the hearing aid. The two microphones provide respective (e.g. analogue or digitized) electric input signals ($s_{IN1}$, $s_{IN2}$) representative of the environment sound. The forward path further comprises (an optional) directional system (BFU) implementing one or more beamformers and providing one or more beamformed signals, here beamformed signal ($s_{INBF}$). The forward path comprises a hearing aid signal processor (HLC) for processing the beamformed signal ($s_{INBF}$) and providing a processed signal ($s_{OUT}$), e.g. configured to compensate for a hearing impairment of the user. The forward path further comprises a loudspeaker (HA-SPK) connected to a speaker sound outlet of the hearing aid and configured to provide an output sound ($S_{HA}$) to an eardrum (Eardrum) of the user in dependence of the processed signal ($s_{OUT}$). The hearing aid further comprises an active emission canceller (AEC) configured to provide an electric sound cancelling signal ($s_{AEC}$) and an environment facing loudspeaker (AEC-SPK) connected to the active emission canceller (AEC) and configured to provide an output sound to the environment (cf. dashed sound symbol denoted $S_{AEC}$ in FIG. 3). The active emission canceller (AEC) is connected to the environment facing loudspeaker (AEC-SPK) and the electric sound cancelling signal ($s_{AEC}$) is determined in dependence of the processed signal ($s_{OUT}$) or from a signal originating therefrom. The electric sound cancelling signal ($s_{AEC}$) is configured to cancel or attenuate sound ($S_{LEAK}$) leaked from the speaker sound outlet to the environment when played by the environment facing loudspeaker (AEC-SPK). The leakage of sound ($S_{LEAK}$) around a housing and possible other parts of the hearing aid (HD) located in the ear canal (see e.g. examples of different hearing aid styles in FIG. 2A, 2B, 2C) is symbolized by dashed bottom rectangle denoted 'Leakage' in FIG. 3. The leakage may be due to a ventilation channel through or along the surface of the hearing aid (or an ITE-part of the hearing aid, see e.g. FIG. 2A, 2B or 2C), or it may be due to an 'open fitting' e.g. comprising a body that does not fill out the cross sectional area of the ear canal, which is guided by an open dome-like element (comprising holes through which sound can leak to (and from) the environment, see e.g. FIG. 2C).

The environment facing loudspeaker (AEC-SPK) may be located on or having a sound outlet at an environment facing surface of the ITE-part, e.g. as close as possible to a main leakage opening (e.g. a ventilation channel), without being located in such opening (e.g. a ventilation channel).

As indicated in FIG. 3, the hearing aid may comprise and eardrum facing input transducer, here microphone ($M_{ED}$), e.g. located close to the speaker sound outlet from hearing aid loudspeaker (HA-SPK). However, the eardrum facing input transducer, here microphone ($M_{ED}$), may be located on or having a sound inlet at an eardrum facing surface of the ITE-part, e.g. as close as possible to a main leakage opening (e.g. a ventilation channel), without being located in such opening (e.g. a ventilation channel). The eardrum facing microphone ($M_{ED}$) is configured to pick up output sound from the speaker sound outlet and to provide an electric signal ($s'_{OUT}$) representative thereof. The active emission canceller (AEC) is configured to provide that the electric sound cancelling signal ($s_{AEC}$) is an estimate of the signal leaked from a residual volume at the eardrum to the environment at the environment facing loudspeaker in dependence of the electric signal ($s'_{OUT}$) from the eardrum facing microphone ($M_{ED}$). The active emission canceller (AEC) is configured to provide that the electric sound cancelling signal ($s_{AEC}$) is played by the environment facing loudspeaker to provide the output sound ($S_{AEC}$) to the environment in opposite phase of the leakage of sound ($S_{LEAK}$). Thereby the leaked sound will be cancelled or (at least) diminished.

The environment facing loudspeaker (AEC-SPK) of a hearing aid according to the present disclosure (including the embodiments of FIG. 2A, 2B, 2C, 3) may be directed in a preferred direction (e.g. by an acoustic outlet canal) to optimize its cancellation effect, maybe in dependence of a location of a ventilation channel opening and/or direction and/or other (intended or unintended (but possibly probable)) leakage channel. Alternatively or additionally, the ITE-part (and/or a BTE-part) may comprise one or more additional environment facing loudspeakers (AEC-SPK), e.g. depending on the application in question. e.g. directed towards each their preferred direction, or adapted to provide a resulting directional output (e.g. as a weighted combination of the individual (electric) loudspeaker outputs).

FIG. 4 shows a simplified block diagram of an embodiment of a hearing device, e.g. a hearing aid, according to the present disclosure comprising an active emission cancelation system comprising a fixed filter (Fixed AEC Filter $\underline{a}$, where $\underline{a}$ represents a transfer function for the fixed filter). The hearing aid comprises a forward path for processing (cf. block 'Processing HLC' in FIG. 4) an audio signal y(n) picked up by a microphone (M) and for providing a processed (e.g. compensated for a user's hearing impairment) signal u(n), which is presented as sound $S_{HA}$ to a user via loudspeaker (HA-SPK). The hearing aid further comprises an active emission canceller, her implemented by a fixed filter (cf. block 'Fixed AEC Filter a' in FIG. 4). The active emission canceller provides electric sound cancelling signal $s_{AEC}(n)$ by filtering the processed signal u(n). In addition to the active emission canceller, the active emission cancellation system further comprises a loudspeaker (AEC-SPK) facing the environment. The environment facing loudspeaker (AEC-SPK) provides output sound $S_{AEC}$ in dependence of electric sound cancelling signal $s_{AEC}(n)$. The output sound $S_{AEC}$ is aimed at cancelling sound provided by the forward path loudspeaker (HA-SPK) of the hearing aid leaked from the ear-canal to the environment, in FIG. 4 represented by feedback sound signal v(n) arriving via (one or more feedback paths) (represented by block 'Feedback Path $\underline{h}(n)$' in FIG. 4, where $\underline{h}(n)$ represents a (time variant) transfer function for the feedback path). The active emission cancellation (output) sound $S_{AEC}$ is mixed with the feedback sound signal v(n) (symbolically indicated by sum unit '+' in FIG. 4) providing resulting emission sound $S_{RES}$ (denoted 'AEC compensated signal, $S_{RES}$' in FIG. 4). The resulting emission sound $S_{RES}$ is mixed with sound from the environment x(n) and picked up by the microphone (M). The electric input signal y(n) representative of sound may thus comprise resulting emission sound $S_{RES}$ (originating from the hearing aid) in addition to the (other) environment sound.

FIG. 5 shows a simplified block diagram of an embodiment of a hearing device according to the present disclosure comprising an active emission cancelation system comprising a fixed filter as shown in FIG. 4 and additionally comprising an adaptive feedback control system. The adaptive feedback control system comprises an adaptive filter and a combination unit (sum unit '+' in the forward path of the hearing aid in FIG. 5). The adaptive filter comprises an adaptive algorithm ('Adaptive Algorithm' block in FIG. 5) and a variable filter ('Adaptive AFC Filter $\underline{h}$'(n)' in FIG. 5). The transfer function of the variable filter is controlled by the adaptive algorithm (cf. arrow from the 'Adaptive Algorithm' block to the 'Adaptive AFC Filter $\underline{h}$'(n)' in FIG. 5). The adaptive algorithm is configured to determine updates to the filter coefficients of the variable filter. The adaptive algorithm may be configured to calculate the filter updates using stochastic gradient algorithms, including some form of the Least Mean Square (LMS) or the Normalized LMS (NLMS) algorithms. They both have the property to minimize an error signal in the mean square sense with the NLMS additionally normalizing the filter update with respect to the squared Euclidean norm of some reference signal Other adaptive algorithms known in the art may be used. The variable filter provides an estimate v'(n) of the feedback signal v(n) (or of the AEC compensated signal $S_{RES}$ in the presence of the fixed AEC filter a), by filtering a reference signal, here the processed signal u(n). In the embodiment of FIG. 5 the adaptive algorithm determines the update filter coefficients of the adaptive filter by minimizing the error signal e(n) in view of the processed signal u(n) (reference signal). The error signal e(n) is the feedback corrected signal provided by the combination unit ('+') of the forward path. The error signal e(n) is here constituted by the electric input signal y(n) subtracted by the estimate v'(n) of the feedback signal v(n) (or of the AEC compensated signal $S_{RES}$. Thereby the signal played by the loudspeaker of the forward path is (ideally) corrected for feedback from the loudspeaker (HA-SPK) to the microphone (M) of the forward path, thereby keeping the audio system stable, in case that the fixed AEC filter a is not sufficient for suppressing the feedback signal v(n) and the resulting emission sound $S_{RES}$ still imposes a high feedback risk.

FIG. 6 shows a simplified block diagram of an embodiment of a hearing device according to the present disclosure comprising an active emission cancelation system comprising an active emission canceller implemented by an adaptive filter. The embodiment of FIG. 6 is equivalent to the embodiment of FIG. 4 except that the fixed filter of the active emission canceller is implemented as an adaptive filter. The adaptive filter works equivalently to the adaptive filter of the feedback control system as described in connection with FIG. 5. The adaptive filter of the active emission cancellation system comprises an adaptive algorithm ('Adaptive Algorithm' block in FIG. 6) and a variable filter ('Adaptive AEC Filter $\underline{a}$(n)' in FIG. 6). In the adaptive filter of the active emission canceller, the adaptive algorithm receives electric input signal y(n) as error signal and the processed signal u(n) as reference signal. Based thereon the adaptive algorithm provides update filter coefficients $\underline{a}$ to the variable filter. The variable filter provides the electric sound cancelling signal $s_{AEC}$(n) by filtering the processed signal u(n).

FIG. 7 shows a simplified block diagram of an embodiment of a hearing device according to the present disclosure comprising an active emission cancelation system comprising an adaptive filter as shown in FIG. 6, and additionally comprising an adaptive feedback control system as shown in FIG. 5, where the function of the adaptive feedback control system is described.

FIG. 8 shows a simplified block diagram of an embodiment of a hearing device according to the present disclosure comprising an active emission cancelation system comprising an adaptive filter and an adaptive feedback control system as shown in FIG. 7, and wherein the active emission cancelation system additionally comprises an eardrum facing microphone ($M_{ED}$). The eardrum facing microphone ($M_{ED}$) is located in the hearing device housing to facilitate the capture of sound from the residual volume near the ear drum (e.g. output sound from the speaker sound outlet) when the hearing device is appropriately mounted in the user's ear canal. The eardrum facing microphone ($M_{ED}$) provides electric input signal z(n) which is fed to the adaptive algorithm of the adaptive filter and may (as shown in FIG. 8) as well be fed to the variable filter of active emission canceller. The signal z(n) from the ear-drum facing microphone ($M_{ED}$) may be used in addition to or as an alternative to the processed signal u(n) in the adaptive algorithm of the AEC system in the determination of update filter coefficients of the variable filer for estimating the electric sound cancelling signal $s_{AEC}$(n). This has the expected advantage that a correct sound shaping of the ear cavity/canal is already included in this microphone signal and there is no need to estimate that from the processed signal u(n).

The 'Adaptive AEC filter input of FIG. 8 receives from the 'output side' the processed signal u(n) as well as the eardrum facing microphone signal z(n). The signals z(n) and u(n) are alternatives to each other.

The eardrum facing microphone signal z(n) is more optimal for the adaptive AEC filter estimation, because it has a shaping of the residual volume (ear cavity)/ear canal.

If the processed signal u(n) has to be used for AEC filter estimation, then it should be corrected for the residual volume (ear cavity)/ear canal. This might have been modelled and compensated by the adaptive filter. However, such modeling would certainly lead to modelling errors (e.g., how fast and how precise is the estimate), and it would increase the adaptive filter length, and a longer adaptive filter leads to undesired properties such as slower convergence rate and higher computational complexity.

It is intended that the structural features of the devices described above, either in the detailed description and/or in the claims, may be combined with steps of the method, when appropriately substituted by a corresponding process.

Embodiments of the disclosure may e.g. be useful in applications such as hearing aids, headsets, earphones, etc.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A hearing device adapted for being located at or in an ear of a user, the hearing device comprising a forward path, the forward path comprising at least one forward path input transducer configured to pick up environment sound from the environment around the user when the user is wearing the hearing device, the at least one input transducer providing at least one electric input signal representative of said environment sound, a forward path signal processor for processing said at least one electric input signal, or a signal originating therefrom, and providing a processed signal, a forward path loudspeaker connected to a speaker sound outlet configured to provide an output sound to an eardrum of the user in dependence of said processed signal, and an ITE-part adapted for being located at least partially in an ear canal of the user, an active emission canceller configured to provide an electric sound cancelling signal, an environment facing loudspeaker connected to the active emission canceller and configured to provide an output sound to the environment, wherein the active emission canceller is connected to the environment facing loudspeaker and wherein the electric sound cancelling signal is determined in dependence of said processed signal or a signal originating therefrom and configured to cancel or attenuate sound leaked from the speaker sound outlet to the environment when played by the environment facing loudspeaker, wherein the environment facing loudspeaker is located on or has a sound outlet on an environment facing surface of the ITE-part.

2. A hearing device according to claim 1 comprising an eardrum facing input transducer located in the ITE-part and configured to pick up said output sound from the speaker sound outlet and to provide an electric signal representative thereof, and wherein the electric sound cancelling signal is determined in dependence thereof.

3. A hearing device according to claim 2 wherein the eardrum facing input transducer is located on or has a sound inlet on an eardrum facing surface of the ITE-part.

4. A hearing device according to claim 1 wherein the ITE-part comprises a ventilation channel, or a multitude of ventilation channels, located in or on the ITE-part.

5. A hearing device according to claim 1 comprising a BTE part adapted for being located at or behind pinna.

6. A hearing device according to claim 5 wherein the BTE-part comprises at least one of the at last one forward path input transducers.

7. A hearing device according to claim 5 wherein the forward path loudspeaker is located in the BTE-part and wherein the speaker sound outlet comprises an acoustic tube for guiding said output sound to said ITE-part for being presented to the user's eardrum.

8. A hearing device according to claim 1 wherein the ITE-part comprises an open dome-like structure comprising one or more openings, which are configured to allow sound to propagate through them.

9. A hearing device according to claim 1 wherein the environment facing loudspeaker is located in the ITE-part.

10. A hearing device according to claim 1 configured to provide that said electric sound cancelling signal is an estimate of the signal leaked from a residual volume at the eardrum to the environment at the environment facing loudspeaker, and that it is played by the environment facing loudspeaker in opposite phase.

11. A hearing device according to claim 1 comprising a fixed filter configured to provide said electric sound cancelling signal in dependence of a predefined filter characteristic.

12. A hearing device according to claim 1 comprising an adaptive filter configured to provide said electric sound cancelling signal in dependence of an adaptively determined filter characteristic.

13. A hearing device according to claim 1 comprising one or more additional loudspeakers for active emission cancellation.

14. A hearing device according to claim 1 comprising a feedback control system configured to cancel or attenuate residual feedback.

15. A hearing device according claim 1 being constituted by or comprising an air-conduction type hearing aid, a headset, an earphone or a pair of earphones, an active ear protection device or a combination thereof.

16. A hearing device adapted for being located at or in an ear of a user, the hearing device comprising a forward path, the forward path comprising at least one forward path input transducer configured to pick up environment sound from the environment around the user when the user is wearing the hearing device, the at least one input transducer providing at least one electric input signal representative of said environment sound, a forward path signal processor for processing said at least one electric input signal, or a signal originating therefrom, and providing a processed signal, a forward path loudspeaker connected to a speaker sound outlet configured to provide an output sound to an eardrum of the user in dependence of said processed signal, and an ITE-part adapted for being located at least partially in an ear canal of the user, an active emission canceller configured to provide an electric sound cancelling signal, an adaptive filter configured to provide said electric sound cancelling signal in dependence of an adaptively determined filter characteristic, an environment facing loudspeaker connected to the active emission canceller and configured to provide an output sound to the environment, wherein the environment facing loudspeaker is located on or has a sound outlet on an environment facing surface of the ITE-part, wherein the active emission canceller is connected to the environment facing loudspeaker and wherein the electric sound cancelling signal is determined in dependence of said processed signal or a signal originating therefrom and configured to cancel or attenuate sound leaked from the speaker sound outlet to the environment when played by the environment facing loudspeaker, wherein the electric sound cancelling signal is provided by filtering the processed signal or a signal originating therefrom by the adaptive filter, and wherein the filter characteristic of the adaptive filter is updated by an adaptive algorithm in dependence of the at least one electric input signal or a signal originating therefrom, and the processed signal or a signal originating therefrom.

17. A hearing device according to claim 16 wherein the ITE-part comprises a dome-like structure comprising one or more openings, which are configured to allow sound to propagate through them.

18. A hearing device according to claim 16 comprising an eardrum facing input transducer located in the ITE-part and configured to pick up said output sound from the speaker sound outlet and to provide an electric signal representative thereof, and wherein the electric sound cancelling signal is determined in dependence thereof.

19. A hearing device according to claim 18 wherein the eardrum facing input transducer is located on or has a sound inlet on an eardrum facing surface of the ITE-part.

20. A hearing device according to claim 18 wherein the electric sound cancelling signal is provided by filtering, by the adaptive filter, the processed signal or the electric signal picked up by the eardrum facing input transducer, and wherein the filter characteristic of the adaptive filter is updated by an adaptive algorithm in dependence of the at least one electric input signal or a signal originating therefrom, and the processed signal or the electric signal picked up by the eardrum facing input transducer.

* * * * *